United States Patent [19]

Gowing

[11] 4,432,156
[45] Feb. 21, 1984

[54] FISHING LURE

[75] Inventor: James R. Gowing, Altus, Ark.

[73] Assignee: EBSCO Industries, Inc., Birmingham, Ala.

[21] Appl. No.: 417,031

[22] Filed: Sep. 13, 1982

[51] Int. Cl.³ ............................................ A01K 85/00
[52] U.S. Cl. .................................. 43/42.31; 43/42.35
[58] Field of Search ................ 43/42.31, 42.22, 42.35, 43/42.39, 42.48

[56] References Cited

U.S. PATENT DOCUMENTS

| 1,878,015 | 9/1932 | Steffensen | 43/42.35 |
| 2,270,487 | 1/1942 | Withey | 43/42.31 |
| 2,641,862 | 6/1953 | Poe | 43/42.31 |
| 2,659,176 | 11/1953 | Wenger | 43/42.35 |
| 3,757,455 | 9/1973 | Strader | 43/42.31 |

Primary Examiner—Gene P. Crosby
Attorney, Agent, or Firm—Woodford R. Thompson, Jr.

[57] ABSTRACT

A fishing lure for surface water fishing includes an elongated body having the natural appearance and swimming characteristics of a small bait fish. A plurality of movable weights are carried by the body within an elongated cavity adjacent the rear end of the body. The cavity and weights are constructed and arranged to permit the weights to move within the cavity and urge the body, while floating at rest, to an upstanding position. Upon retrieval of the body along the water's surface, the weights move within the cavity to impart oscillation to the body about an elongated axis extending through the body in opposite directions to produce a rattling sound that attracts fish.

3 Claims, 5 Drawing Figures

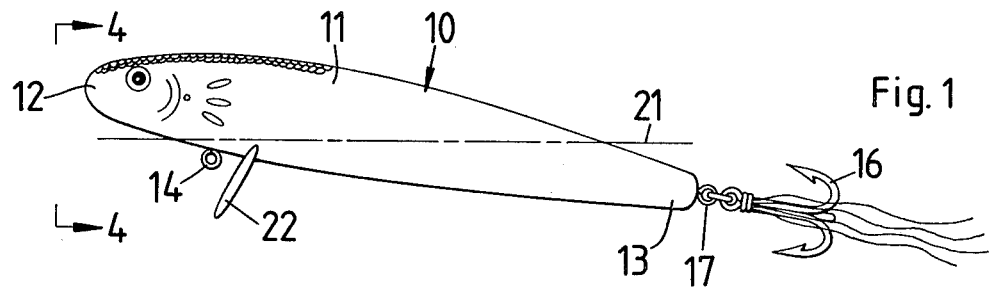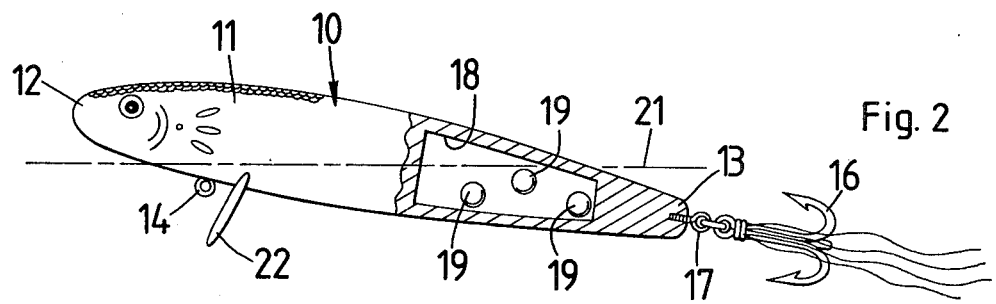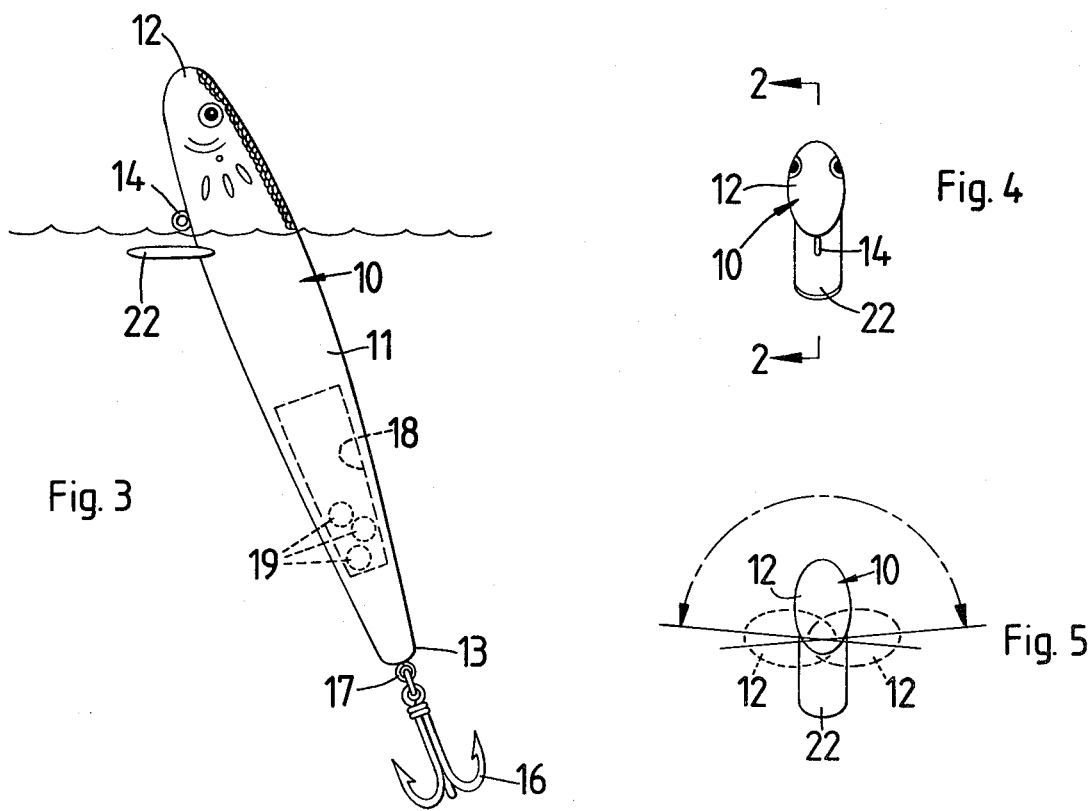

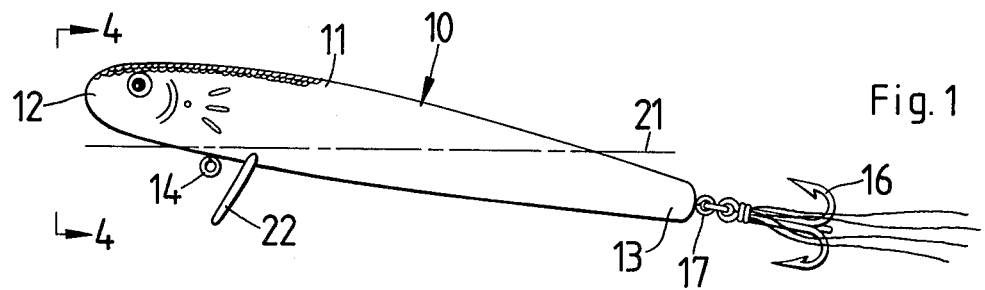
Fig. 1
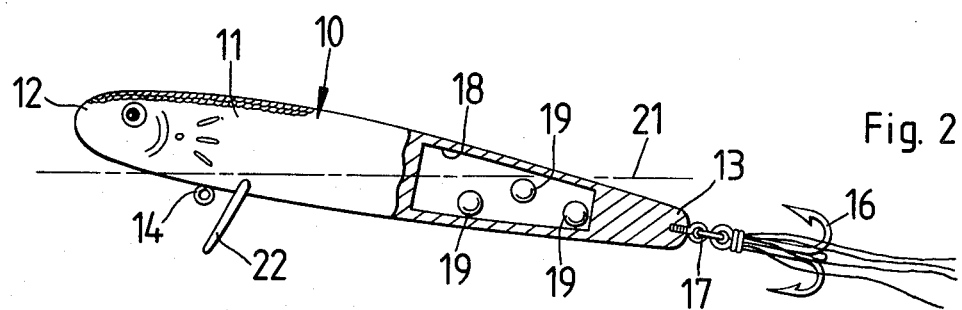
Fig. 2
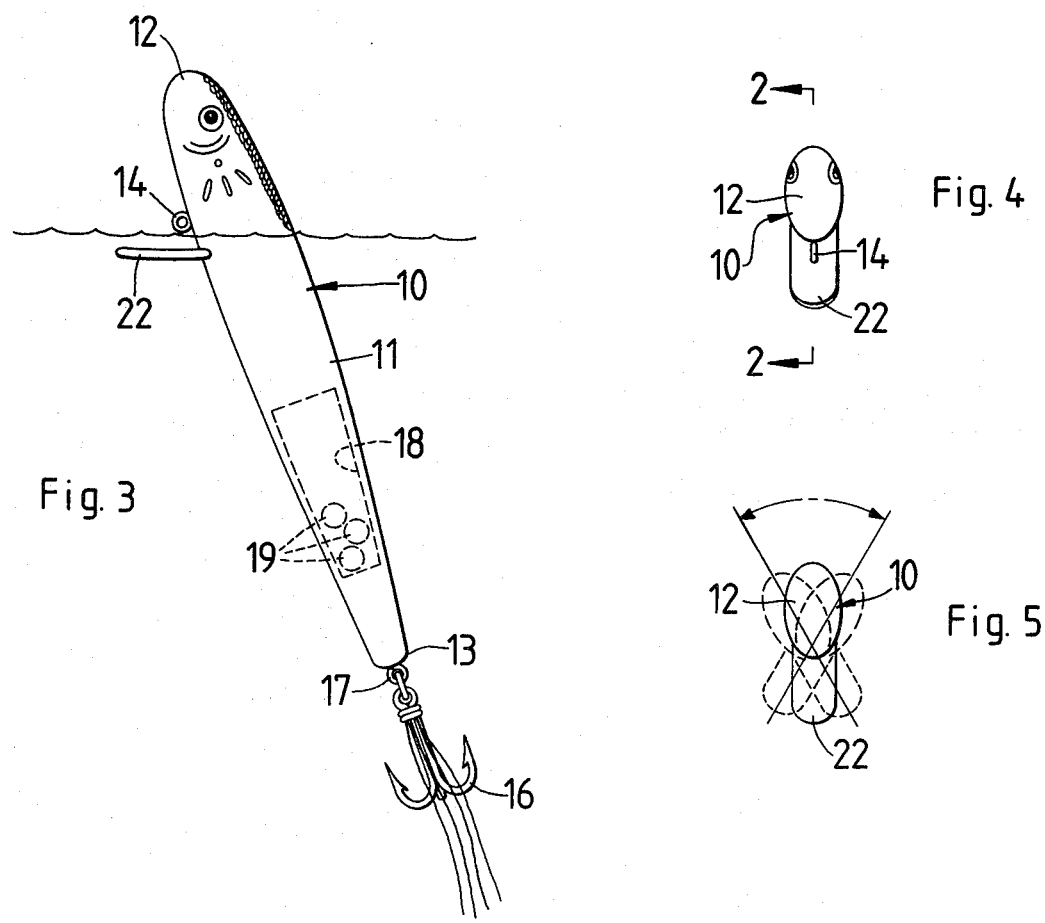
Fig. 3
Fig. 4
Fig. 5

FISHING LURE

BACKGROUND OF THE INVENTION

This invention relates to a fishing lure and more particularly to an improved surface fishing lure which produces an oscillating movement and rattling sound that is very attractive to fish each time the lure is pulled along the surface of the water.

Heretore in the art to which my invention relates, many fishing lures have been proposed to simulate the movement of minnows and other small bait fish swimming along the surface of the water. Such lures have not been entirely satisfactory for the reason that they look somewhat unnatural and do not produce a swimming movement that attracts fish. Also, some of the surface lures with which I am familiar are not resistant to wear and lack the durability to be struck and/or taken by fish repeatedly without damaging the lure.

SUMMARY OF THE INVENTION

In accordance with my present invention, I overcome the above and other difficulties by providing an improved surface fishing lure which has the natural appearance of a small bait fish and produces an oscillating movement and rattling sound that is very attractive to fish each time it is pulled along the surface of the water.

Another object of my invention is to provide an improved surface lure which is resistant to wear and has the required durability to be struck and/or taken by fish repeatedly without causing damage to the lure.

My improved fishing lure comprises an elongated body having the natural appearance and swimming characteristics of a small bait fish. A plurality of movable weights are carried within a closed cavity adjacent the rear end portion of the lure body. The cavity and weights are constructed and arranged for the weights to move within the cavity and urge the body, while floating at rest, toward a generally upstanding position. Upon medium retrieval of the body along the surface of the water, the weights are adapted to move within the cavity and impart oscillation to the body about an elongated axis extending through the body in opposite directions to thus produce a rattling sound that attracts fish.

BRIEF DESCRIPTION OF THE DRAWING

A fishing lure embodying features of my invention is illustrated in the accompanying drawing, forming a part of this application, in which:

FIG. 1 is a side elevational view showing the position assumed by my improved fishing lure in response to a medium retrieval along the surface of the water;

FIG. 2 is a side elevational view, partly broken away and in section, showing the elongated cavity and movable weights;

FIG. 3 is a side elevational view showing my improved fishing lure at rest in a generally upstanding position;

FIG. 4 is a front end view taken generally along the line 4—4 of FIG. 1; and,

FIG. 5 is a diagrammatic end view corresponding to FIG. 4 showing the oscillating movement of my improved fishing lure in dotted lines with parts being omitted for the sake of clarity.

DETAILED DESCRIPTION

Referring now to the drawing for a better understanding of my invention, I show in FIG. 1 my improved surface fishing lure 10 as having the natural appearance and shape of a minnow or small bait fish. The lure 10 comprises an elongated body 11 which is preferably formed from a light-weight durable plastic material and includes a rounded front end portion 12 and a gradually tapering rear end portion 13. An eyelet 14 is carried by the lower surface of the front end portion 12 for detachably connecting the lure to a fishing line, not shown. Since the area around the eyelet 14 is not obstructed, a fisherman may easily attach his line to the eyelet without using a swivel or other special attachment device. A fishing hook 16 is connected to an eyelet 17 carried by the rear end portion 13 of the body 11, as shown.

An elongated enclosed cavity 18 is formed within the body 11 adjacent the rear end portion 13, as shown in FIGS. 2 and 3. Mounted within the cavity 18 are a plurality of movable weights 19. The cavity 18 and weights 19 are constructed and arranged to permit the weights to move within the cavity and urge the body 11, while floating at rest, toward a generally upstanding position with its front end portion extending above the surface of the water, as shown in FIG. 3. Upon medium retrieval of the body 11 along the surface of the water, the weights 19 are adapted to move within the cavity 18 and impart oscillation to the body 11 and thus produce a rattling sound that is very attractive to fish. In other words, when the lure 10 is being retrieved at a medium rate along the water's surface with its front end portion 12 extending above the water's surface and its rear end portion 13 extending below the water's surface, the weights 19 move within the cavity 18 and impart oscillation to the body 11 about an elongated axis indicated by the dot-dash line 21 extending through the lower surface of the front end portion 12 and through the upper surface of the rear end portion 13, as shown in FIGS. 1 and 2. That is, the movement of the body 11 through the water causes the weights 19 to move within the cavity below the axis 21 and oscillate the body about the axis in opposite directions as shown in dotted lines in FIG. 5. The movement of the weights 19 in the cavity 18 also creates a rattling sound which is attractive to fish.

In actual practice, I have found that upon a moderate rate of retrieval, the lure 10 oscillates in opposite directions about the axis 21 through an angular distance of approximately 170°. When the lure 10 is retrieved at a fast rate, it will roll over on its back.

As shown in the drawing, a laterally projecting paddle-like member 22 is carried by the lower surface of the body 11 adjacent the front end portion 12. When the lure 10 is pulled along the surface of the water, the paddle-like member 22 extends downwardly into the water to aid in balancing the lure, as shown in FIG. 1.

From the foregoing description, the operation of my improved surface fishing lure as shown in the drawing will be readily understood. With the lure 10 attached to a fishing line, the fisherman casts the lure into the water and permits the lure to come to rest in its generally upstanding rest position, as shown in FIG. 3. The fisherman then retrieves the lure whereupon the body 11 floats along the surface of the water in a generally horizontal position, as shown in FIG. 1. The movement of the body 11 along the water's surface causes the weights 19 to move within the cavity 18 and impart oscillation to the lure 10 about the axis 21 in opposite directions, as shown in FIG. 5, to produce a rattling sound that is attractive to fish.

From the foregoing, it will be seen that I have devised an improved surface fishing lure which is durable of construction and has the natural appearance of a minnow or other small bait fish. By providing movable weights within the lure that create an oscillating movement and rattling sound, I provide a surface lure which simulates the swimming movement of a small bait fish along the surface of the water and also one which is very attractive to fish.

While I have shown my invention in but one form, it will be obvious to those skilled in the art that it is not so limited, but is susceptible of various changes and modifications without departing from the spirit thereof.

What I claim is:

1. A fishing lure comprising,
   (a) an elongated body having means subjacent the front end portion thereof for connecting the body to a fishing line and having at least one fishing hook carried by the rear end portion thereof,
   (b) there being an elongated cavity within the rear portion of said body, and
   (c) a plurality of movable weights within said cavity with said cavity and said weights being constructed and arranged for said weights to move within said cavity while said body is floating at rest to urge said body to a generally upstanding position with its front end portion extending above the surface of the water and for said weights to move within said cavity upon retrieval of said body along the surface of the water to impart oscillation to said body about an elongated axis extending along the surface of the water and through the lower surface of said front end portion and the upper surface of said rear end portion in opposite directions with said weights being below said elongated axis and said oscillating movement of said body producing a rattling sound that attracts fish.

2. A fishing lure as defined in claim 1 in which said movable weights are adapted to impart oscillation to said body about said elongated axis through an angular distance of approximately 170° upon medium retrieval of the lure and said weights cause the lure to roll over on its back upon fast retrieval of the lure.

3. A fishing lure as defined in claim 1 in which a laterally projecting paddle-like member is carried by the lower surface of said front end portion in position to balance said body as it moves along surface of the water.

* * * * *